(12) United States Patent
Moreau et al.

(10) Patent No.: US 9,186,752 B2
(45) Date of Patent: Nov. 17, 2015

(54) BRAZING METHOD FOR A COMPONENT OF AN AIR CONDITIONING CIRCUIT COMPRISING A FLUID REFRIGERANT RECEIVER, AND SUCH A RECEIVER

(75) Inventors: Laurent Moreau, Reims (FR); Lionel Taupin, Cormicy (FR); Patrick Zanchetta, Betheny (FR)

(73) Assignee: Valeo Systems Thermiques, Le Mesnil-Saint-Denis (FR)

( * ) Notice: Subject to any disclaimer, the term of this patent is extended or adjusted under 35 U.S.C. 154(b) by 674 days.

(21) Appl. No.: 13/518,495

(22) PCT Filed: Dec. 9, 2010

(86) PCT No.: PCT/EP2010/069312
§ 371 (c)(1),
(2), (4) Date: Dec. 6, 2012

(87) PCT Pub. No.: WO2011/076584
PCT Pub. Date: Jun. 30, 2011

(65) Prior Publication Data
US 2013/0125577 A1    May 23, 2013

(30) Foreign Application Priority Data
Dec. 22, 2009    (FR) ..................................... 09 06246

(51) Int. Cl.
*B23K 31/02*    (2006.01)
*B23K 1/00*    (2006.01)
*B23K 1/20*    (2006.01)
*F25B 43/00*    (2006.01)

(52) U.S. Cl.
CPC ............... *B23K 31/02* (2013.01); *B23K 1/0012* (2013.01); *B23K 1/20* (2013.01); *F25B 43/006* (2013.01); *B23K 2201/14* (2013.01)

(58) Field of Classification Search
CPC ........ B23K 1/0012; B23K 1/20; B23K 31/02; B23K 2201/14; F25B 43/006
USPC .............................. 62/430, 509, 298; 228/214
See application file for complete search history.

(56) References Cited

U.S. PATENT DOCUMENTS

| 2,845,138 A | 7/1958 | Gageby |
| 4,675,971 A * | 6/1987 | Masserang ..................... 29/422 |
| 5,177,865 A | 1/1993 | Hoffmuller |

(Continued)

FOREIGN PATENT DOCUMENTS

FR    2 849 176 A1    6/2004

OTHER PUBLICATIONS

International Search Report w/translation for PCT/EP2010/069312 dated Mar. 11, 2011, 6 pages.

*Primary Examiner* — Mohammad M Ali
(74) *Attorney, Agent, or Firm* — Osha Liang LLP

(57) ABSTRACT

The present invention relates to a brazing method for a component (100) of an air-conditioning circuit comprising a fluid refrigerant receiver (200), said receiver containing a desiccator (210) for said fluid refrigerant. Said method includes the steps consisting of: equipping said receiver (200) with confinement means (221, 222) capable of insulating said desiccator (210) from said component (100); assembling and brazing together said receiver (200) and said component (100); releasing said confinement means (221, 222). The invention also relates to a fluid receiver intended in particular for implementing such a method, with application to the air conditioning of motor vehicles.

10 Claims, 2 Drawing Sheets

(56) References Cited

U.S. PATENT DOCUMENTS

| | | | | |
|---|---|---|---|---|
| 5,201,792 A | * | 4/1993 | Study | 62/503 |
| 5,289,697 A | * | 3/1994 | Hutchison | 62/474 |
| 5,375,327 A | * | 12/1994 | Searfoss et al. | 29/890.06 |
| 5,596,882 A | * | 1/1997 | Hutchison et al. | 62/503 |
| 5,689,880 A | * | 11/1997 | Petty | 29/890.06 |
| 5,701,758 A | * | 12/1997 | Haramoto et al. | 62/503 |
| 5,778,697 A | * | 7/1998 | Wantuck | 62/503 |
| 5,855,293 A | * | 1/1999 | Slais | 220/612 |
| 5,865,998 A | * | 2/1999 | Abraham et al. | 210/282 |
| 5,966,810 A | * | 10/1999 | Chisnell et al. | 29/890.06 |
| 6,125,651 A | * | 10/2000 | Tack et al. | 62/503 |
| 2007/0006524 A1 | * | 1/2007 | Welin-Berger | 44/530 |
| 2008/0272592 A1 | | 11/2008 | Shaw | |

\* cited by examiner

BRAZING METHOD FOR A COMPONENT OF AN AIR CONDITIONING CIRCUIT COMPRISING A FLUID REFRIGERANT RECEIVER, AND SUCH A RECEIVER

The present invention relates to a brazing method for a component of an air-conditioning circuit comprising a fluid refrigerant receiver, and a fluid refrigerant receiver intended in particular for the implementation of such a method.

The invention finds a particularly advantageous application in the field of the air conditioning of motor vehicles.

In general terms, air-conditioning circuits are required to meet a certain number of strict criteria concerning their cleanliness and the environment inside the pipes inside which the refrigerant fluid, for example the fluid known as R134A, circulates.

It is essential, in fact, to avoid the presence inside the pipes of foreign bodies which are either too numerous or too large in size, because these may cause problems capable of leading to the failure of certain components of the air-conditioning circuits, such as the compressor.

The refrigerant fluid, on the other hand, must be able to circulate in a moisture-free environment, since the molecules of water exhibit a tendency to produce acidic compounds in the presence of R134A and oil. These compounds then attack the seals that are present along the length of the circuits, which can result in leaks and the loss of functionality.

Furthermore, it is an established practice to equip certain components of air-conditioning circuits, notably the condenser, with receivers containing at least partially a certain quantity of refrigerant fluid in the liquid phase. These receivers are used, on the one hand, as fluid reservoirs intended to compensate for any leaks in the circuits and, on the other hand, to guarantee that, upon exiting from the receivers, the refrigerant fluid in its totality is in the liquid phase before being channeled, for example, towards the pressure regulator for the circuit. In particular embodiments, the output from the receiver is returned into a section of the condenser in such a way as to cause the liquid refrigerant fluid to undergo a supplementary passage known as a sub cooling passage.

It has also been proposed to take advantage of the presence of receivers on the route followed by the refrigerant fluid in order to resolve the problems of cleanliness and environment mentioned above. For this purpose, a filter and a desiccator are arranged on the inside of the receivers in order to eliminate, to the maximum extent possible, the presence of foreign bodies and moisture in the circulation loops of the refrigerant fluid.

Receivers fall into two large families, namely receivers known as removable receivers and receivers known as integrated receivers.

Removable receivers are supplied already equipped with a filter and a desiccator. They are assembled at the finishing stage of the component concerned, generally the condenser, by using screws and o-rings. Although this type of receiver exhibits the advantage of being detachable, it still requires a costly, specific assembly operation.

Integrated receivers are attached directly to the component and are subject to the same brazing process.

Taking into account the difficulty of brazing the component due to the degassing of the desiccator, provision is made on certain integrated receivers for an opening, via which the filter and the desiccator may be introduced into the bottles at the finishing stage, the opening being closed by means of a removable stopper. It is thus possible to change the filter and the desiccator as required without having to replace the entire component.

In order to reduce the manufacturing costs and the inherent risks of leaks in the sealing system through the o-rings used in the removable stoppers, there is a benefit to be had from the use of sealed, integrated receiver systems.

Sealed, integrated receiver systems of this kind are known, in which the opening provided for the introduction of the filter and the desiccator is closed by a cap that is sealed by tungsten welding under an inert gas (known as TIG welding) or by laser welding.

This solution is not very interesting in terms of its cost, however, since finished TIG welding or laser welding is relatively heavy.

It is for this reason that sealed, integrated receivers brazed in a single operation with the component, the filter and the desiccator are preferred. This solution is very economical because there is no need to perform any other supplementary operations on the component after it emerges from the brazing oven.

This type of solution is nevertheless associated with a remaining difficulty, which resides in the behavior of the desiccator in the course of the brazing process. In fact, at a high temperature, the diffuser exhibits a tendency to diffuse moisture, which pollutes the neutral atmosphere of the oven and interferes with the brazing operation, in the direction of the component with which it communicates. This results in leaks in the components which preclude the industrialization of this solution.

One object of the invention is also to propose a brazing method of the type which involves brazing in a single operation, the intention being to prevent the propagation of the molecules of water that are degassed by the desiccator as far as the zones of the component to be brazed, which would result in brazing of poor quality.

This object is achieved according to the invention thanks to a method for brazing a component of an air-conditioning circuit comprising a fluid refrigerant receiver, said receiver containing a desiccator for said refrigerant fluid, characterized in that said method comprises stages consisting of:
  equipping said receiver with means of containment capable of isolating said desiccator from said component,
  assembling and brazing together said receiver and said component,
  releasing said means of containment.

It will thus be appreciated that, during the brazing process, the desiccator remains contained in the interior of the receiver, thereby preventing any pollution of the brazing atmosphere by the moisture that is likely to escape as a consequence of the degassing of the desiccator. The containment of the desiccator is lifted at the end of the brazing operation, however, in order to permit the desiccating effect of the latter during the normal functioning of the component.

According to a first embodiment, said means of containment are means of closure, in particular fusible means of closure, for the closure of at least one communication opening for the receiver with the component.

The expression "at least one communication opening" is understood to denote either the single opening permitting the passage of the refrigerant fluid from the component to the receiver, the output from the receiver being connected to the inlet to the component situated downstream in the air-conditioning circuit, or the openings permitting the passage of the refrigerant fluid from the component to the receiver and the return of the fluid from the receiver to the container, for example in the context of a condenser having a sub cooling passage.

The means of closure may be realized in the form of fine covers such that, as envisaged by the invention, said means of containment are capable of being released under the action of a variation in the external pressure. In this context, it is thus sufficient, at the end of the brazing operation, to apply to the interior of the component a positive pressure or a negative pressure adequate to cause the covers to rupture and to establish communication between the component and the receiver via the one or more initially closed openings.

Said variation in the external pressure is advantageously a positive pressure applied in the course of a tightness test performed on the receiver/component assembly. It is already known that, after brazing, the air-conditioning components are tested in such a way as to be able to guarantee their tightness at the time of delivery to the client. This test is usually performed using helium at a pressure of bar or thereabouts. This positive pressure is sufficient to perforate the thin covers which close off the communication openings between the component and the receiver.

In this first embodiment, any pollution in the interior of the receiver due to the degassing of the desiccator in the course of the brazing operation can be avoided if the method according to the invention comprises a first supplementary stage involving the realization, prior to brazing the receiver/component assembly, of an orifice for the communication of the desiccator with the exterior of the receiver, and a second supplementary stage involving closing off said orifice after brazing.

According to a second embodiment, said means of containment comprise an envelope containing the desiccator. However, the latter is confined to the interior of the envelope forming a bag for the desiccator, which prevents all pollution by moisture both in the interior of the component and in the interior of the receiver.

If, as envisaged by the invention, the envelope also contains means for perforating said envelope, it will be appreciated that, at the end of brazing, the envelope is compressed against the means of perforation, for example under the action of the pressure of the tightness test, the effect of which is to tear the envelope, at least partially, and in so doing to expose zones of contact between the desiccator and the refrigerant fluid.

The invention also relates to a fluid refrigerant receiver intended to equip a component, for example a condenser, of an air-conditioning circuit, said receiver containing a desiccator for said refrigerant fluid and means of containment capable of isolating said desiccator from said component during a simultaneous operation for brazing said receiver and said component. Said receiver is thus intended, in particular, to be used in the above-mentioned process.

As already mentioned, according to different embodiments:
- said means of containment are capable of being released under the action of a variation in the external pressure,
- said means of containment are means of closure, in particular fusible means of closure, for the closure of at least one communication opening for the receiver with the component,
- said means of containment comprise an envelope containing the desiccator,
- the envelope containing the desiccator is enclosed within a rigid supporting structure,
- said envelope also contains means for perforating said envelope,
- said envelope is attached to said rigid supporting structure by a means of connection capable of tearing said envelope.

The following description with reference to the accompanying drawings, which are provided by way of example without limitation, clearly indicates what the invention consists of and how it can be realized.

FIG. 7a is a sectioned view, according to a radial cut plane, of a supporting tube for the desiccator in FIG. 3.

FIG. 7b is a perspective view of the supporting tube in FIG. 7a.

Figure 1A:
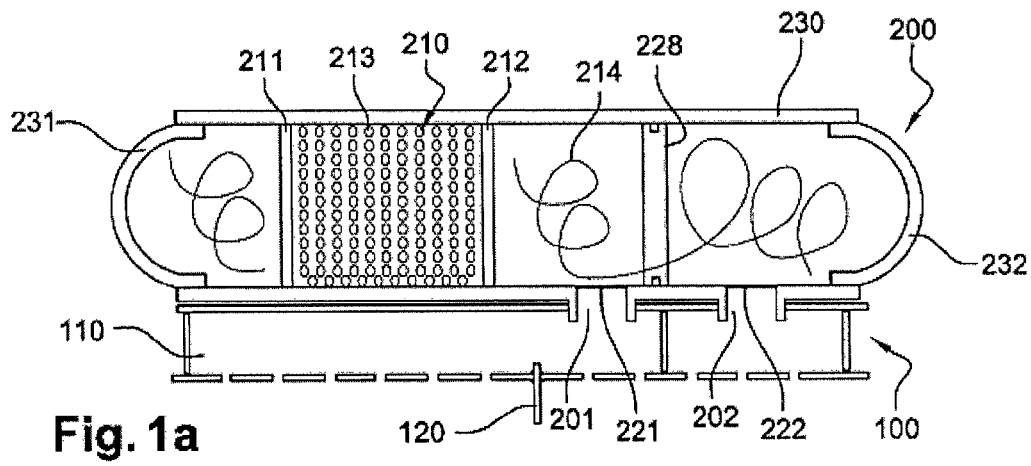
FIG. 1a is a sectional view, according to a longitudinal cut plane, of a first embodiment of a receiver for an air-conditioning component comprising containment covers.
Figure 1B:
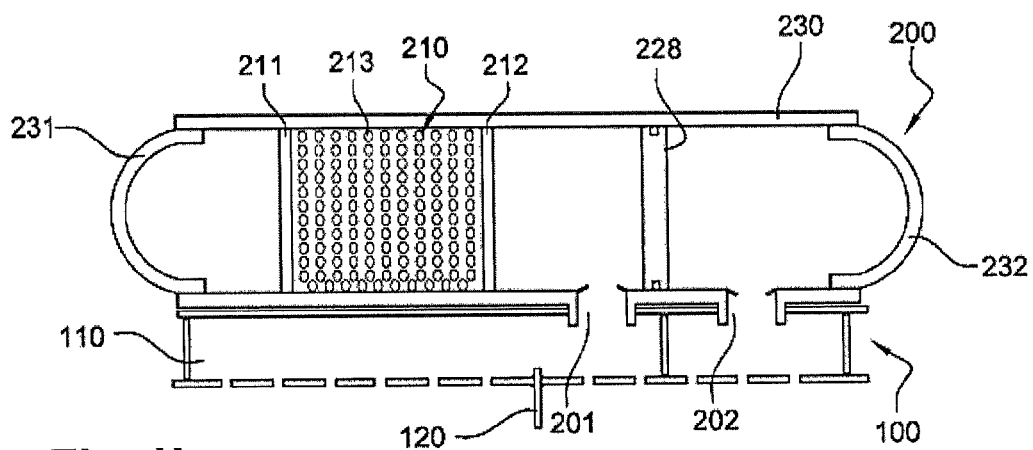
FIG. 1b is a sectional view of the receiver in FIG. 1a, of which the containment covers have been opened.
Figure 2:
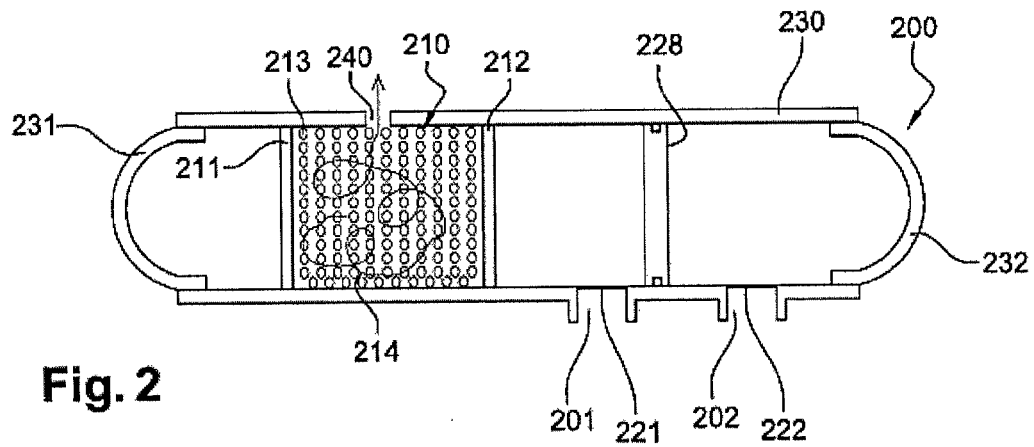
FIG. 2 is a view of a variant embodiment of the receiver in FIGS. 1a and 1b.

Illustrated in FIGS. 1a, 1b and 2 is a component 100 of an air-conditioning circuit, for example a condenser, equipped with a receiver 200 for a refrigerant fluid. Only the elements of the condenser 100 situated in proximity to the receiver 200 are depicted in these figures, namely the collector box 110 and the extremity of the bundle of tubes, such as the tube 120, communicating with the collector box 110.

The receiver 200 consists of a cylindrical body 230 which can be perforated by two openings 201, 202 for communicating with the condenser 100 and is closed at its extremities by caps 231, 232.

In general, the receiver 200 is intended to contain refrigerant fluid in the liquid phase, which constitutes a reserve of fluid capable of compensating for any leaks which may occur in the air-conditioning circuit. The receiver 200 also makes it possible to ensure that the refrigerant fluid as it exits from the condenser 100 is in the liquid state before it arrives at the pressure regulator for the circuit. In the example in FIGS. 1a, 1b and 2, the receiver 200 is in the sub cooling configuration, in the sense that, when the receiver/condenser assembly is functioning, the refrigerant fluid, after having entered the receiver 200 via the inlet opening 201, returns to the condenser 100 via the outlet opening 202.

As already explained above, the receiver 200 also contains a desiccator 210 and a filter 228, the intention being to eliminate respectively any moisture and any foreign bodies that are present in the refrigerant fluid and are likely to cause leaks and losses of functionalities or the rupture of certain components of the air-conditioning circuit.

The desiccator 210 illustrated in FIGS. 1a, 1b and 2 consists of beads 213 of silica contained between two metal grilles 211, 212 made of a material such as stainless steel, of which the melting point is higher than the brazing temperature of about 600° C. The metal grilles 211, 212 can be crimped or brazed onto the wall of the cylindrical body 230 of the receiver 200.

The receiver 200 in this case is of the integrated type, that is to say it is first assembled mechanically to the condenser 100 before brazing, and it is then brazed at the same time as the condenser.

In the absence of special precautions, there is a risk that, in the course of the brazing process, the degassing of the desiccator 210 will release molecules of water, which may then make their way into the receiver 200 and eventually end up, via the openings 201, 202, in the collector box 110 as far as the tube passage 120. The atmosphere inside the component and inside the oven then becomes contaminated, resulting in brazing of poor quality and defective tightness in the bundle of tubes in the one or more collector boxes and/or the receiver.

In order to avoid this inconvenience, the invention proposes to isolate the desiccator 210 from the condenser 100 thanks to means of containment, which, in the embodiment depicted in FIGS. 1a, 1b and 2, are covers 221, 222 closing off the inlet and outlet openings 201, 202.

These covers are realized before brazing, for example at the time of machining the openings, by retaining a thickness of metal, generally aluminum. In the course of brazing, and as depicted in FIG. 1a, the presence of the covers 221, 222 prevent the migration of the products 214 of degassing from the desiccator 210 towards the collector box 110 and the tube passages 120, thereby guaranteeing an optimal quality of brazing. These covers must be eliminated, of course, on completion of the brazing, which may be effected by perforation in the course of the tightness testing of the condenser, which test is performed by means of helium at a pressure of about 25 bar prior to delivery to the client. It is thus necessary to make provision for the covers 221, 222 to be given a relatively small thickness, for example in the order of a few tenths of a millimeter.

FIG. 1b depicts the receiver/condenser assembly after opening the covers 221, 222.

It must be emphasized at this point that the release of the means of containment, the covers in the embodiment described here, may be achieved more generally by means of any variation in the external pressure, regardless of whether this is a positive pressure or a negative pressure.

Likewise, given that the machining of a thin thickness of aluminum may prove to be a delicate operation, the covers 221, 222 may be realized more advantageously by covering the communication openings 201, 202 with a fine aluminum foil having a thickness of a few tenths of a millimeter.

It is also possible to close off the openings 201, 202 by means of a material that is capable of degrading in the course of brazing. In this case, the pollution due to the degassing of the desiccator 210 remains contained inside the receiver during brazing and disappears at the end of brazing. This solution has the advantage of eliminating the risks of releasing foreign bodies into the air-conditioning circuit, as may be the case with covers made of aluminum.

In order to ensure optimal brazing of the closing caps 231, 232 onto the body 230 of the receiver, and in accordance with FIG. 2, an orifice 240 for the communication of the desiccator 210 with the exterior of the receiver 200 can be arranged across the body 230 of the receiver prior to brazing, in order to permit, at the time of brazing, the evacuation from the receiver 200 of the products 214 of degassing of the desiccator 210. At the end of the brazing operation, the orifice 240 is closed, for example by a TIG-welded seam.

Figure 3:
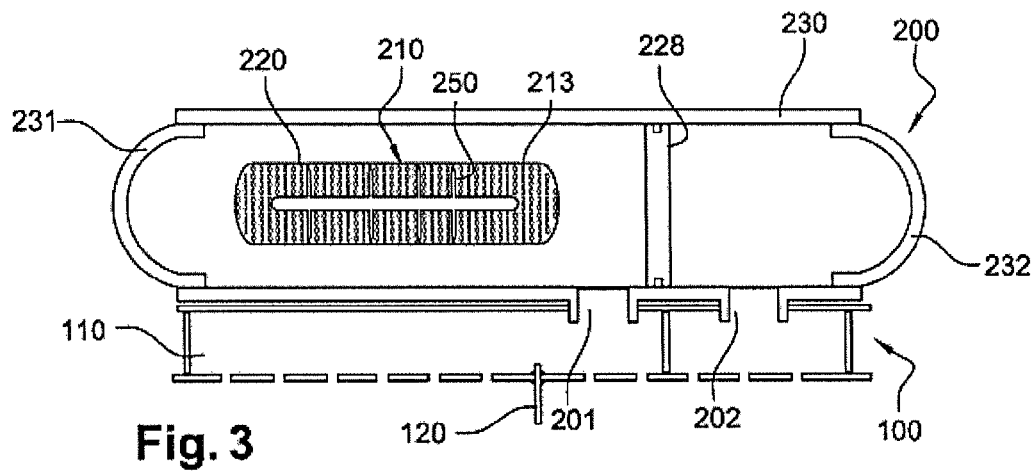
FIG. 3 is a sectional view, according to a longitudinal cut plane, of a second embodiment of a receiver for an air-conditioning component comprising a containment envelope of a desiccator.

FIG. 3 depicts a variant embodiment, in which said means of containment are constituted by an envelope 220 containing the desiccator 210.

The thickness of the material of the envelope 220 is such that it must be sufficiently flexible to enable it to be compressed during the tightness test under helium at 25 bar. By way of example, the envelope may be realized with a piece of aluminum foil having a thickness below 200 µm, closed by welding.

Figure 5:
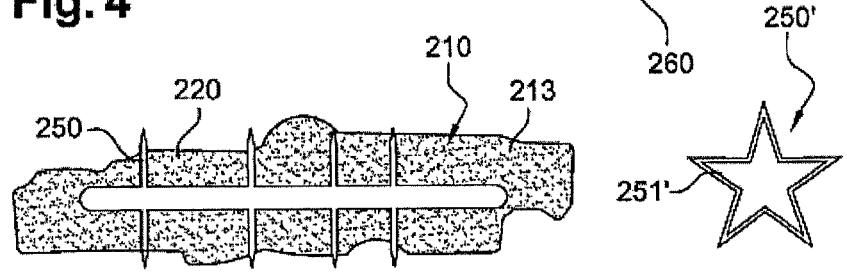
FIG. 5 is a sectioned view, according to a longitudinal cut plane, of the desiccator in FIG. 3 after brazing.

The bag formed by the envelope 220 also contains means 250 of perforation capable of perforating the envelope when it is compressed under the pressure of 25 bar in the course of the tightness test, and thus capable of releasing the action of the desiccator 210. In the example depicted in FIG. 3, the means 250 of perforation are points made of stainless steel, aluminum or some other material, of which the melting point is greater than the brazing temperature, around 600° C. FIG. 5 depicts the bag 220 for the desiccator 210 in a compressed and perforated state after the tightness test has been performed.

Taking into account the high temperatures that are reached during the brazing process, the volume of the bag 220 is multiplied by a factor which depends on the pressure at which it would have been filled initially. This factor has a value of about 3 for filling at atmospheric pressure, compared to 1.5 for a filling pressure of 0.5 bar.

Figure 4:
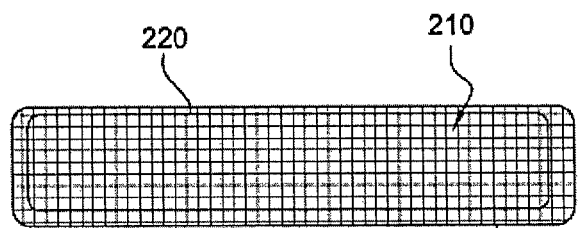
FIG. 4 is a side view of a retaining grille for the desiccator in FIG. 3.

Also, in order to avoid tearing of the envelope 220 as a result of an increase in its volume during phases of high temperature, provision can be made to enclose the bag inside a rigid supporting structure which, in the embodiment illustrated in FIG. 4, exhibits the form of a grille 260 made of stainless steel or aluminum, for example.

Figure 6:
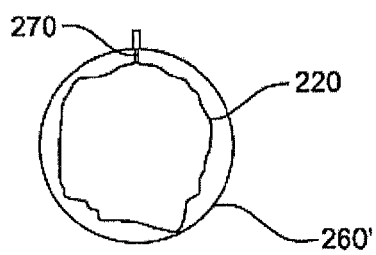
FIG. 6 is a sectioned view, according to a radial cut plane, of a means for perforating the containment envelope depicted in FIG. 3.

FIG. 6 depicts a variant of the means for perforating the envelope 220. This is a piece 250' obtained by 2-D stamping, of which the profile exhibits five edges 251' in the form of the blade of a knife permitting the envelope to be cut in a consistent manner and providing the desiccator 210 with sufficient contact with the refrigerant fluid during the functioning of the condenser.

Figures 7A, 7B:
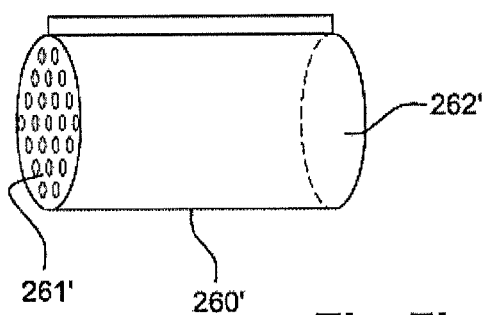

FIGS. 7a and 7b depict another illustrative embodiment of a rigid supporting structure for the bag 220 during brazing, consisting of a tubular body 260' closed by means of grilles 261', 262' at each of its extremities. Inside the structure, the bag 220 is attached to the tubular body 260' by a mechanical link 270 which causes tearing of the envelope 220 during the tightness test.

The invention claimed is:

1. A brazing method for a component of an air-conditioning circuit comprising a fluid refrigerant receiver, said receiver containing a desiccator for said refrigerant fluid, said method comprising:
    equipping said receiver with means of containment capable of isolating said desiccator from said component;
    assembling and brazing together said receiver and said component; and
    releasing said means of containment,
    wherein said means of containment comprise an envelope containing said desiccator,
    wherein said envelope containing said desiccator is enclosed within a rigid supporting structure, and
    wherein said envelope comprises means for perforating said envelope.

2. The method as claimed in claim 1, in which said means of containment are capable of being released under said action of a variation in external pressure.

3. The method as claimed in claim 2, in which said variation in said external pressure is a positive pressure applied in said course of a tightness test performed on said receiver/component assembly.

4. The method as claimed in claim 1, wherein said means of containment are means for said closure of at least one communication opening for said receiver with said component.

5. The method as claimed in claim 4, further comprising a first supplementary stage comprising a realization, prior to brazing said receiver/component assembly, of an orifice for said communication of said desiccator with said exterior of said receiver, and a second supplementary stage comprising closing off said orifice after brazing.

6. The method as claimed in claim 1, wherein said envelope is attached to said rigid supporting structure by a means of connection capable of tearing said envelope.

7. A fluid refrigerant receiver intended to equip a component of an air-conditioning circuit, said receiver comprising:
- a desiccator for said refrigerant fluid; and
- means of containment capable of isolating said desiccator from said component during a simultaneous operation for brazing said receiver and said component,
- wherein said means of containment are capable of being released under said action of a variation in external pressure,
- wherein said means of containment comprise an envelope containing said desiccator,
- wherein said envelope containing said desiccator is enclosed within a rigid supporting structure, and
- wherein said envelope further comprises means for perforating said envelope.

8. The receiver as claimed in claim 7, wherein said means of containment are means for closure of at least one communication opening for said receiver with said component.

9. The receiver as claimed in claim 7, in which said envelope is attached to said rigid supporting structure by a means of connection capable of tearing said envelope.

10. The receiver as claimed in claim 7, wherein said component is a condenser.

* * * * *